US008409346B2

(12) United States Patent
Selph et al.

(10) Patent No.: US 8,409,346 B2
(45) Date of Patent: *Apr. 2, 2013

(54) WASTE STORAGE VESSELS AND COMPOSITIONS THEREFOR

(75) Inventors: Jeffrey L. Selph, Cary, NC (US); James W. Paul, Jr., Mechanicsville, VA (US)

(73) Assignee: Grancrete, Inc., Cary, NC (US)

( * ) Notice: Subject to any disclaimer, the term of this patent is extended or adjusted under 35 U.S.C. 154(b) by 458 days.

This patent is subject to a terminal disclaimer.

(21) Appl. No.: 12/572,812

(22) Filed: Oct. 2, 2009

(65) Prior Publication Data

US 2010/0089292 A1    Apr. 15, 2010

(51) Int. Cl.
*C04B 9/04* (2006.01)
*C04B 12/02* (2006.01)

(52) U.S. Cl. ........ 106/801; 106/685; 106/690; 106/694; 106/695; 106/704; 588/256; 588/257

(58) Field of Classification Search .................. 106/801, 106/705, 716, 718, 685, 690, 694, 695, 704; 588/3, 4, 9, 10, 256, 257; 250/506.1
See application file for complete search history.

(56) References Cited

U.S. PATENT DOCUMENTS

| | | | |
|---|---|---|---|
| 3,879,209 A | 4/1975 | Limes et al. | |
| 3,960,580 A | 6/1976 | Stierli et al. | |
| 4,175,005 A | 11/1979 | Harstead | |
| 4,257,912 A | 3/1981 | Fleischer et al. | |
| 4,326,918 A | 4/1982 | Lapides | |
| 4,355,060 A | 10/1982 | Cornwell | |
| 4,504,555 A | 3/1985 | Prior et al. | |
| 4,541,870 A | 9/1985 | Barrett, Jr. | |
| 4,842,649 A | 6/1989 | Heitzmann et al. | |
| 4,898,701 A * | 2/1990 | Atkinson et al. | 264/109 |
| 4,956,321 A | 9/1990 | Barrall | |
| 5,002,610 A | 3/1991 | Sherif et al. | |
| 5,080,022 A | 1/1992 | Carlson | |
| 5,100,586 A | 3/1992 | Jennings | |
| 5,114,617 A | 5/1992 | Smetana et al. | |
| 5,311,945 A | 5/1994 | Cowan et al. | |
| 5,402,455 A | 3/1995 | Angelo, II et al. | |
| 5,597,120 A | 1/1997 | Chess, Jr. | |
| 5,645,518 A | 7/1997 | Wagh et al. | |
| 5,718,757 A | 2/1998 | Guillou et al. | |
| 5,788,762 A | 8/1998 | Barger et al. | |
| 5,830,815 A | 11/1998 | Wagh et al. | |
| 5,846,894 A | 12/1998 | Singh et al. | |
| 6,133,498 A | 10/2000 | Singh et al. | |
| 6,136,088 A | 10/2000 | Farrington | |
| 6,153,809 A | 11/2000 | Singh et al. | |

(Continued)

FOREIGN PATENT DOCUMENTS

WO    WO 02/24598 A2    3/2002

OTHER PUBLICATIONS

International Search Report and the Written Opinion for PCT/US2009/059477 mailed on May 3, 2010.

(Continued)

*Primary Examiner* — Paul Marcantoni
(74) *Attorney, Agent, or Firm* — Myers Bigel Sibley & Sajovec, PA

(57) ABSTRACT

Waste storage vessels formed from a composition including calcium silicate, magnesium or calcium oxides and an acid phosphate are provided. The composition may also include fly ash or kaolin with or without the calcium silicate.

2 Claims, 2 Drawing Sheets

Example #s and Ordinary Concrete

U.S. PATENT DOCUMENTS

| | | |
|---|---|---|
| 6,204,214 B1 | 3/2001 | Singh et al. |
| 6,264,740 B1 | 7/2001 | McNulty, Jr. |
| 6,290,769 B1 | 9/2001 | Carkner |
| 6,458,423 B1 | 10/2002 | Goodson |
| 6,475,275 B1 | 11/2002 | Nebesnak et al. |
| 6,498,119 B2 | 12/2002 | Wagh et al. |
| 6,518,212 B1 | 2/2003 | Wagh et al. |
| 6,561,269 B1 | 5/2003 | Brown et al. |
| 6,719,993 B2 | 4/2004 | Constantz |
| 6,776,837 B2 | 8/2004 | Wagh et al. |
| 6,783,799 B1 | 8/2004 | Goodson |
| 6,790,518 B2 | 9/2004 | Grace et al. |
| 7,045,476 B1 | 5/2006 | Lally |
| 7,160,383 B2 | 1/2007 | Wagh et al. |
| 7,204,880 B1 | 4/2007 | Turner et al. |
| 7,288,148 B2 | 10/2007 | Hicks et al. |
| 7,429,290 B2 | 9/2008 | Lally |
| 7,491,267 B2 * | 2/2009 | Francis et al. ............. 106/690 |
| 7,699,928 B2 * | 4/2010 | Paul, Jr. ................... 106/691 |
| 7,744,693 B2 * | 6/2010 | Mabey ...................... 106/801 |
| 2002/0009622 A1 | 1/2002 | Goodson |
| 2003/0041785 A1 | 3/2003 | Harrison |
| 2003/0127025 A1 | 7/2003 | Orange et al. |
| 2003/0131759 A1 | 7/2003 | Francis et al. |
| 2004/6783799 | 8/2004 | Goodson |
| 2004/0194657 A1 | 10/2004 | Lally |
| 2005/0000393 A1 | 1/2005 | Virtanen |
| 2005/0016421 A1 | 1/2005 | Fujimori et al. |
| 2005/0160944 A1 | 7/2005 | Wagh et al. |
| 2005/0229809 A1 | 10/2005 | Lally |
| 2005/0252419 A1 | 11/2005 | Mabey |
| 2005/0274290 A1 | 12/2005 | Wagh et al. |
| 2006/0048682 A1 | 3/2006 | Wagh et al. |
| 2006/0074141 A1 | 4/2006 | Hayner |
| 2006/0264687 A1 | 11/2006 | Matthews |
| 2007/0102672 A1 | 5/2007 | Hamilton |
| 2007/0235702 A1 | 10/2007 | Wagh et al. |
| 2008/0011200 A1 | 1/2008 | Paul |
| 2010/0083877 A1 * | 4/2010 | Selph et al. ............. 106/691 |
| 2010/0090168 A1 * | 4/2010 | Selph et al. ............. 252/478 |

OTHER PUBLICATIONS

Notification of Transmittal of the International Search Report and the Written Opinion of the International Searching Authority, or the Declaration corresponding to PCT/US2007/015856 mailed Nov. 27, 2007.

U.S. Appl. No. 12/572,795, filed Oct. 2, 2009, Selph et al.

Notification Concerning Transmittal of International Preliminary Report on Patentability for PCT/US2009/059477 mailed on Apr. 21, 2011.

Notification Concerning Transmittal of International Preliminary Report on Patentability for PCT/US2009/059476 mailed on Apr. 21, 2011.

International Search Report corresponding to PCT/US2009/059476 mailed on May 3, 2010.

Written Opinion corresponding to PCT/US2009/059476 mailed on May 3, 2010.

Gurevich et al. Database WPI Week 198740 Thomson Scientific, London, GB AN 1987-283636 XP002675602 (1987).

Supplementary European Search Report corresponding to EP 09819697 dated May 15, 2012.

Supplementary European Search Report corresponding to EP 09819698 dated May 15, 2012.

* cited by examiner

WASTE STORAGE VESSELS AND COMPOSITIONS THEREFOR

RELATED APPLICATION

This application claims priority to U.S. Provisional Application Ser. No. 61/102,997, filed Oct. 6, 2008, the contents of which are hereby incorporated by reference as if recited in full herein.

FIELD AND BACKGROUND OF THE INVENTION

The present invention relates generally to waste storage vessels and compositions useful therein, and particularly for the storage of hazardous and/or radioactive waste.

Concrete or cement is often a candidate material for use in radioactive waste storage. For example, U.S. Pat. No. 5,786, 611 proposes containers for storing spent nuclear wastes. The containers comprise concrete with stable uranium oxide aggregate and a neutron absorbing material such as $B_2O_3$, $HfO_3$ or $Gd_2O_3$. U.S. Pat. Nos. 4,257,912, 4,326,918, 4,845, 372, and 4,950,246 propose concrete encapsulation for spent nuclear fuel storage. U.S. Pat. No. 5,402,455 proposes a multilayer concrete-based storage container for hazardous, radioactive, and mixed waste materials.

There is; however, a need for compositions for waste storage vessels which are less expensive and less dependent on complicated containment structures, while providing acceptable levels of shielding the environment from the hazardous aspects of the waste.

SUMMARY OF THE INVENTION

The present invention provides a waste storage vessel composition comprising calcium silicate, magnesium oxide and an acid phosphate.

In another embodiment, the present invention provides a waste storage vessel composition comprising magnesium or calcium oxide, an acid phosphate and fly ash.

In still another embodiment, the present invention provides a waste storage vessel composition comprising magnesium or calcium oxide, an acid phosphate and kaolin. These vessels all have an improved attenuation coefficient as compared to conventional Portland cement concrete based on photon energies of 0.662 MeV (5 µCi Cs-137 source) and 1.173 MeV (1 µCi Co-60 source).

DETAILED DESCRIPTION OF THE INVENTION

Figure 1:
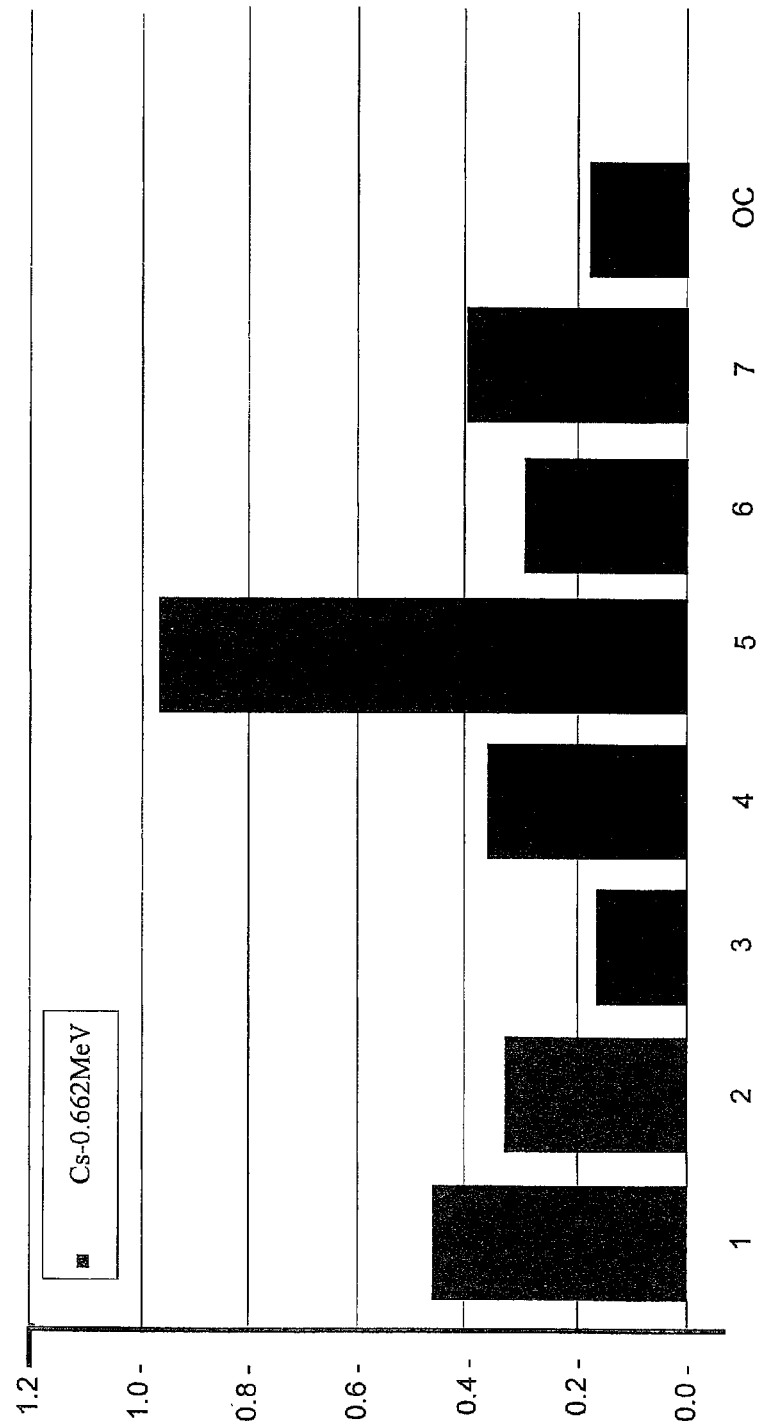
FIG. 1 is a graph of attenuation coefficients for compositions suitable for the waste vessel and exemplified in Examples 1-6 and ordinary concrete ("OC") for 0.666 MeV photon energy using a 5 mCi Cs-137 source.

The foregoing and other aspects of the present invention will now be described in more detail with respect to other embodiments described herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items. Furthermore, the term "about," as used herein when referring to a measurable value such as an amount of a compound, dose, time, temperature, and the like, is meant to encompass variations of 20 percent, 10 percent, 5 percent, 1 percent, 0.5 percent, or even 0.1 percent of the specified amount. Unless otherwise defined, all terms, including technical and scientific terms used in the description, have the same meaning as commonly understood by one of ordinary skill in the art to which this invention belongs. All references cited are incorporated herein by reference in their entireties.

The waste vessel may comprise calcium silicate (wollastonite), magnesium oxide and an acid phosphate. In one embodiment, the composition of the vessel comprises about 15 to 40 percent by weight calcium silicate, about 10 to 35 percent by weight magnesium oxide and about 25 to 45 percent by weight acid phosphate. Such a composition optionally may include kaolin and/or fly ash at a 0.1 to 40 percent by weight level.

In another embodiment, the waste vessel comprises magnesium or calcium oxide, an acid phosphate and fly ash. In one embodiment, the composition of the vessel comprises 15 to 40 percent by weight calcined magnesium or calcium oxide, 25 to 55 percent by weight acid phosphate and 20 to 40 percent by weight fly ash. Optionally 0.1 to 40 percent by weight kaolin may be included.

In another embodiment, the waste vessel comprises magnesium or calcium oxide, an acid phosphate and kaolin. In one embodiment, the composition of the vessel comprises 15 to 40 percent by weight calcined magnesium or calcium oxide, 20 to 55 percent by weight acid phosphate and 5 to 25 percent by weight kaolin. Optionally 0.1 to 40 percent by weight fly ash may be included.

The present invention includes the method of storing waste materials comprising encapsulating the waste material in, by or with, one or more of the above composition.

Exemplary acid phosphates include monopotassium phosphate, magnesium phosphate, sodium phosphate, aluminum phosphate, ammonium phosphate, iron phosphate, zinc phosphate, and combinations thereof In the embodiments above, the acid phosphate may be monopotassium phosphate.

Exemplary waste materials to be stored include hazardous waste, radioactive waste, and mixed waste comprising hazardous and radioactive wastes. Exemplary sources of such waste are spent nuclear fuel and nuclear fuel cells. The waste storage vessel formed from the above compositions may have multiple geometries (e.g., round, square, cylindrical, hexagonal, etc.) depending on the desired storage configuration. The storage vessel may be formed solely of one or more of the above compositions and encapsulate the waste material to be stored. Alternatively, the vessel may comprise an external housing formed from any material with or without any shielding characteristics and one ore more of the above compositions encapsulating the waste material. In another embodiment, the vessel can comprise an external non-shielding material, an internal housing formed from a non-shielding material and one or more of the above compositions encapsulating the internal housing. Additionally, the waste vessel may be combined with radiation shielding such as described in related application, U.S. Ser. No. 12/572,795, filed Oct. 2, 2009, the disclosure of which is incorporated herein by reference in its entirety.

Suitable additives may be mixed with the radiation shielding structure composition and typically the amounts added may be from about 0.1 to about 30 percent by weight. Exemplary additives include flame retardants, vermiculite, perlite, fibers, emulsifiers, deflocculates, sequestrates, granular additives, coarse aggregates such as stone and sand, chemical additives such as boric acid, accelerators (e.g., Accelguard available from The Euclid Chemical Company, Cleveland, Ohio) colorants and pigments, fillers, aggregates, borax, silica materials, iron oxides, bonding adhesives (e.g., Eucopoxy Resin and Eucoweld available from The Euclid Chemical Company, Cleveland, Ohio, Flexcon, and Corr-bond) plasticizers, hardeners (e.g., Euco Diamond Hard available from The Euclid Chemical Company, Cleveland, Ohio), patching polymers (e.g., Eucorapid patch available from The Euclid Chemical Company, Cleveland, Ohio), micro silica fume (e.g., Eucoshot available from The Euclid Chemical Company, Cleveland, Ohio), setting retarders, surface softeners, and kaolins, curing compounds (e.g., Brownstone CS), water reducers (e.g., Accelguard, Eucon AC), and air entrainers (e.g., AEA and Air Mix).

Alternatively, neutron absorbers also may be added to the radiation shielding structure. Exemplary neutron absorbers include heavy metals and heavy metal compounds such as boron, $B_2O_3$, $HfO_3$, $Gd_2O_3$, iron oxides, lead, and the like.

Alternatively, various reinforcement may be included in the composition or the composition may be applied to the reinforcement. Exemplary reinforcement includes steel (e.g. rebar), other metals (e.g., lead), carbon, polymers, glass, stone, basalt, and the like in fiber, particulate and/or fabric/mat form.

The following examples are merely illustrative of the invention, and are not limiting thereon.

EXAMPLES

Examples 1-6 were formulated as follows:

Example 1

| | |
|---|---|
| Magnesium Oxide | 23% |
| Monopotassium Phosphate | 23% |
| Fly Ash | 21% |
| Sand | 33% |

The sample tested had a thickness of 0.50 inches.

Example 2

| | |
|---|---|
| Magnesium Oxide | 20% |
| Monopotassium Phosphate | 23% |
| Calcium Silicate | 24% |
| Sand | 33% |

The sample tested had a thickness of 1.25 inches. inches.

Example 3

Example 1 was repeated with salt water. The sample tested had a thickness of 2.00 inches.

Example 4

| | |
|---|---|
| Magnesium Oxide | 23% |
| Monopotassium Phosphate | 23% |
| Fly Ash | 11% |
| Kaolin | 10% |
| Sand | 33% |

The sample tested had a thickness of 0.75 inches.

Example 5

| | |
|---|---|
| Magnesium Oxide | 30% |
| Monopotassium Phosphate | 34% |
| Calcium Silicate | 36% |

The sample tested had a thickness of 0.50 inches.

Example 6

| | |
|---|---|
| Magnesium Oxide | 30% |
| Monopotassium Phosphate | 31% |
| Fly Ash | 28% |
| Sodium Bicarbonate | 10% |

The sample tested had a thickness of 1.00 inches.

Example 7

Example 1 was repeated and the sample tested had a thickness of 1.00 inches. The testing was conducted using a method for measuring attenuation coefficients developed by North Carolina State University.

Figure 2:
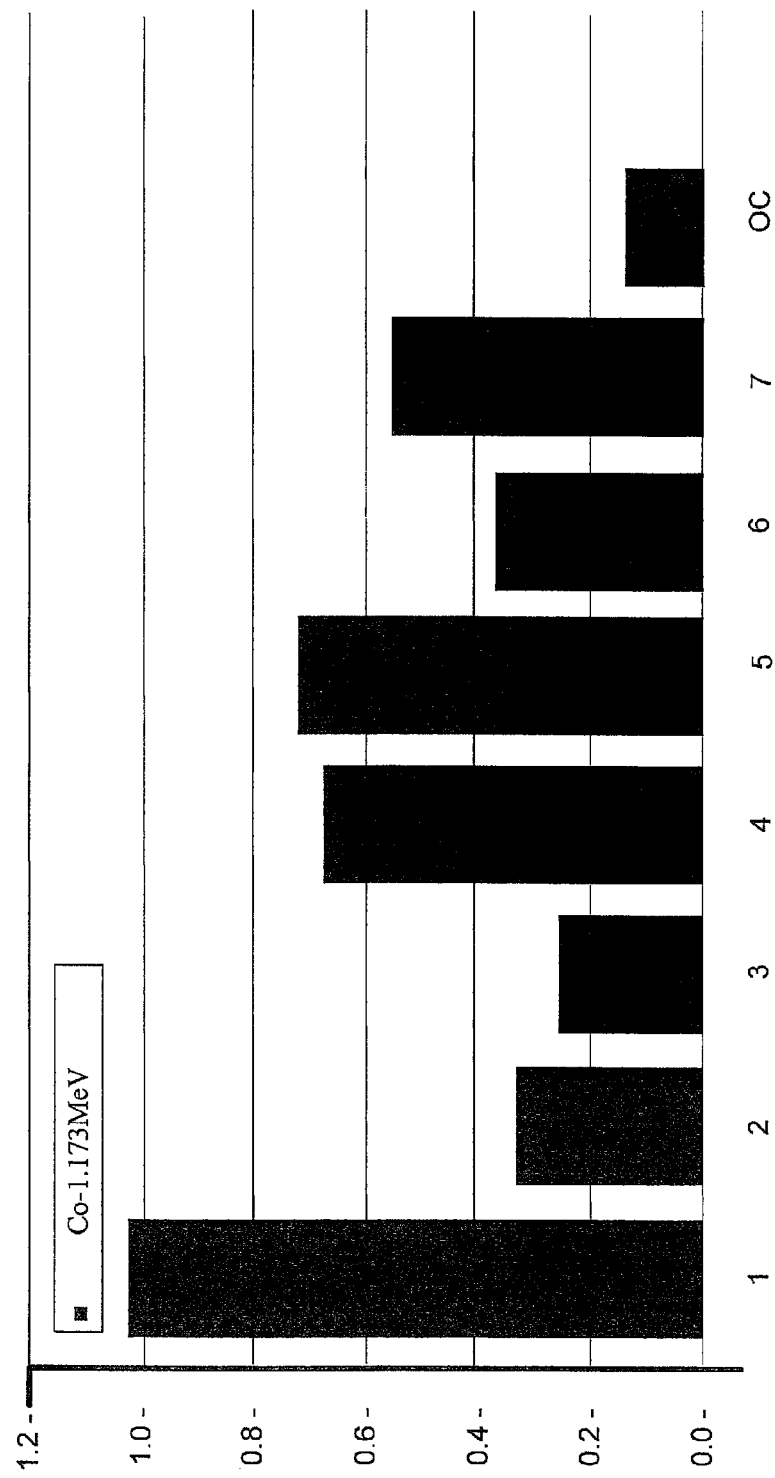
FIG. 2 is a graph of attenuation coefficients for compositions suitable for the waste vessel and exemplified in Examples 1-6 and conventional Portland cement concrete ("OC") for 1.173 MeV photon energy using a 1 µCi Co-60 source.

As can be seen from FIGS. 1 and 2, the formulations for Examples 1-6 have significantly improved attenuation coefficients as compared to conventional Portland cement concrete.

Example 8

A formulation as follows was prepared.

| | |
|---|---|
| Magnesium Oxide | 34% |
| Monopotassium Phosphate | 31% |
| Fly Ash | 17% |
| Kaolin | 15% |

Example 9

| | |
|---|---|
| Magnesium Oxide | 34% |
| Monopotassium Phosphate | 31% |
| Fly Ash | 17% |
| Kaolin | 15% |
| Sand | 30% |

Accelerated corrosion tests were conducted on Example 8 and compared to the Ready Mix cement both with steel bars embedded therein. The samples are submerged in an electronically charged acid bath. After about 100 hours, the Ready Mix cement showed significant cracking while the composition of Example 8 exhibited no cracking after 500 hours.

Hydraulic conductivity testing of Example 8 using ASTM D5084 shows a barrier of approximately 4 to 5 inches is sufficient for 300+ years.

Chloride ion testing and compressive strength (ASTM C109) was done on Example 8, Example 9, and Ready Mix cement samples and the results are provided in Table 1.

| | Average total weight | Average Chloride Uptake | Compressive strength |
|---|---|---|---|
| Example 8 | 0.91% | 0.13% | 8410 (3 days) |
| Example 9 | 1.24% | 0.22% | 8000 (3 days) |
| Ready Mix Cement | 1.38% | 0.36% | 4440 (28 days) |

Neutron Attenuation

Example 5 was made into two cylinders, one 8 inches, the other 16 inches, with boron laden stone as an aggregate.

Neutron attenuation activity was measured using a PuBe neutron source which generates neutrons in the 1 to 10 MeV range with an average energy of 4.2 MeV. The neutrons were detected with at Boner Sphere neutron spectrometer system with a source to detector distance of 30". The cylinders were tested (dosed) as one 8" cylinder and two together (i.e. 16" cylinders) and compared to a blank (no mass). The resulting doses in this experiment were 9.2 mRem/hr for the blank, 3.0 mRem/hr for the 8" cylinder and 2.6 mRem/hr for the 16" cylinders. The shielding values demonstrated an attenuation of 67% for the 8" cylinder and 72% attenuation for 16" cylinders.

The neutron attenuation is typically expressed in units of tenth-value layers (TVL). These data predicts a TVL of 40 cm for the 8" cylinder at 4.2 MeV. In comparison, the typical TVL is 22 cm for normal concrete used in shielding photoneutrons produced by medical linear accelerators where the energy is in the 0.5 MeV range. Thus neutron attenuation is improved.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. The waste storage vessel having an attenuation coefficient as compared to conventional Portland cement concrete based on photo energies of 0.662 MeV (5 µCi Cs-137 source) and 1.173 MeV (1 µCi Co-60 source) comprising 15 to 35 percent by weight calcined magnesium oxide or calcium oxide, 15 to 55 percent by weight acid phosphate and 20 to 40 percent by weight kaolin.

2. The waste storage vessel of claim 1, wherein the acid phosphate is monopotassium phosphate.

* * * * *

UNITED STATES PATENT AND TRADEMARK OFFICE
CERTIFICATE OF CORRECTION

| | |
|---|---|
| PATENT NO. | : 8,409,346 B2 |
| APPLICATION NO. | : 12/572812 |
| DATED | : April 2, 2013 |
| INVENTOR(S) | : Selph et al. |

Page 1 of 1

It is certified that error appears in the above-identified patent and that said Letters Patent is hereby corrected as shown below:

On Title Page:
Item 60, Domestic Priority Data: Please add the priority data below:
-- This application claims the benefit of 61/102,997 10/06/2008 --

In the Specification:
Column 1, Line 53:
Please correct "Examples 1-6 and ordinary concrete"
to read -- Examples 1-6 and conventional Portland cement concrete --

Signed and Sealed this
First Day of July, 2014

Michelle K. Lee
*Deputy Director of the United States Patent and Trademark Office*